United States Patent [19]

Kaziura et al.

[11] Patent Number: 4,757,382
[45] Date of Patent: Jul. 12, 1988

[54] TRANSPORTING DEVICES

[75] Inventors: Toshihiro Kaziura, Osaka; Norio Oita, Kobe; Junnosuke Abe, Osaka, all of Japan

[73] Assignee: Kanebo Ltd., Tokyo, Japan

[21] Appl. No.: 839,137

[22] Filed: Mar. 13, 1986

[30] Foreign Application Priority Data

| Mar. 14, 1985 [JP] | Japan | 60-50969 |
| Mar. 14, 1985 [JP] | Japan | 60-50970 |
| Jul. 29, 1985 [JP] | Japan | 60-167984 |

[51] Int. Cl.$^4$ .............................. H04N 7/00
[52] U.S. Cl. ................. 358/101; 198/689.1; 382/8
[58] Field of Search .......... 198/689.1; 358/101, 358/106; 382/8, 16, 18, 48, 52; 414/744 B; 250/223 R

[56] References Cited

U.S. PATENT DOCUMENTS

| 3,592,334 | 7/1971 | Fleischaner | 198/689.1 X |
| 3,760,453 | 9/1973 | Neumann | 198/689.1 X |
| 3,942,788 | 3/1976 | Boyle | 198/689.1 X |
| 3,983,987 | 10/1976 | Lynch | 198/689.1 |
| 4,466,073 | 8/1984 | Boyan et al. | 358/101 X |
| 4,481,533 | 11/1984 | Alzmann et al. | 358/101 |
| 4,494,139 | 1/1985 | Shima et al. | 358/101 |
| 4,613,269 | 9/1986 | Wilder et al. | 358/101 X |
| 4,618,938 | 10/1986 | Sandland et al. | 382/8 X |

FOREIGN PATENT DOCUMENTS 35789 7/1982 Japan .
32125 7/1983 Japan .

Primary Examiner—James J. Groody
Assistant Examiner—Victor R. Kostak
Attorney, Agent, or Firm—Stevens, Davis, Miller & Mosher

[57] ABSTRACT

A transport device is provided which includes a pair of opposed parallel plates having respective outer edges spaced apart from one another to form an open slit area between the outer edges and an inside area between respective central portions of the opposed plates. Both the outer edges are movable and are adapted to receive the articles thereon to transport the same. A suction device sucks air from the outside through the open slit area and into the inside area to hold the articles by suction on the outer edges of the opposed parallel plates.

9 Claims, 19 Drawing Sheets

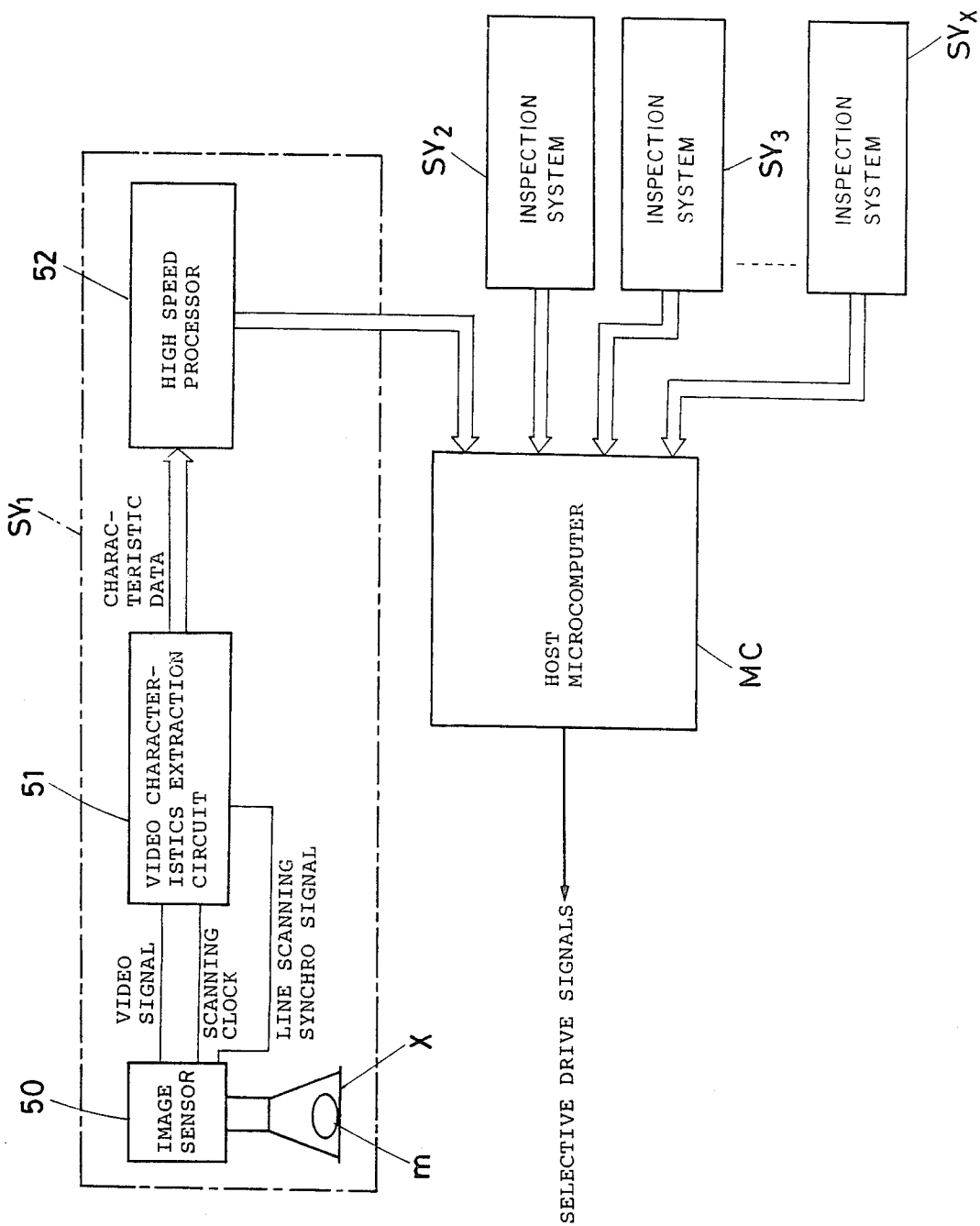

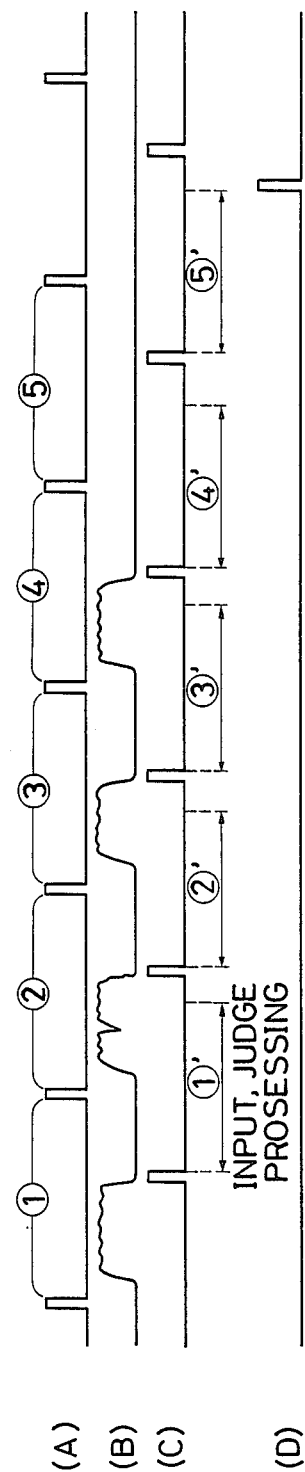

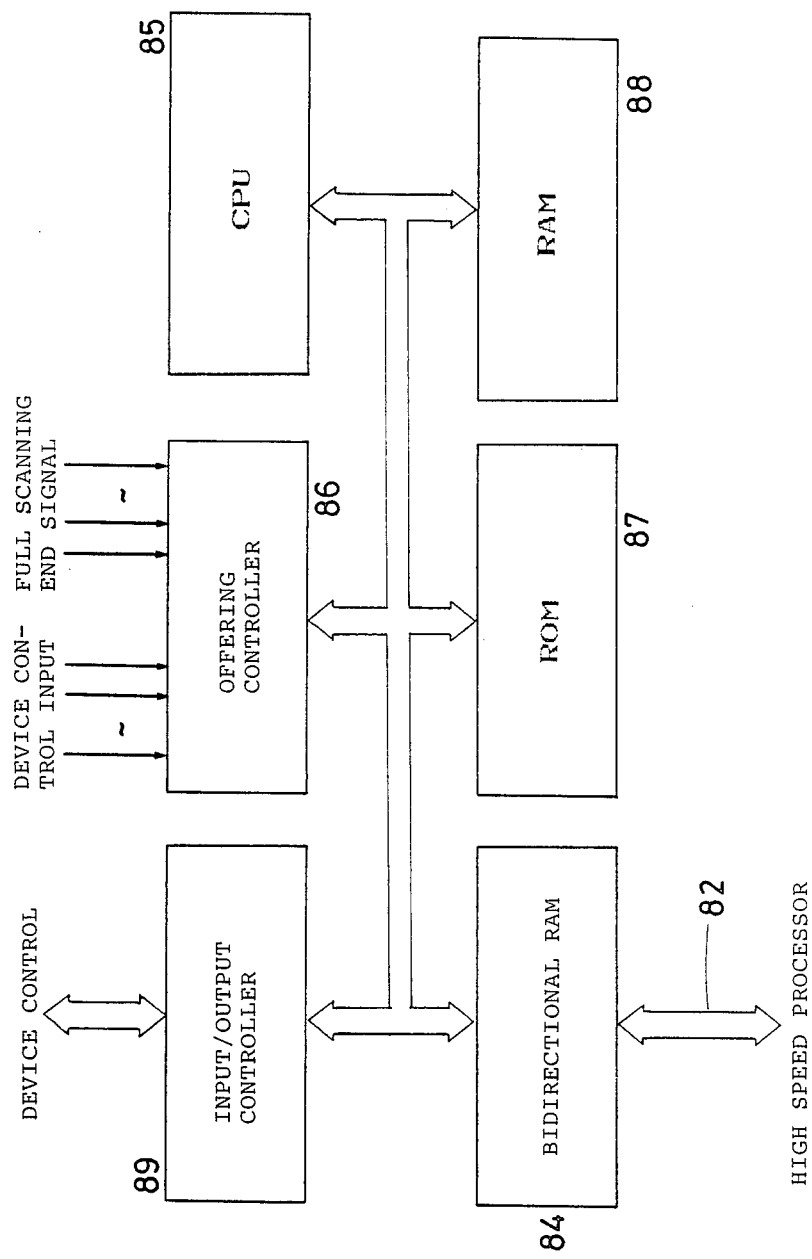

TRANSPORTING DEVICES

BACKGROUND OF THE INVENTION

This invention relates to a transportation device useful for transporting primarily small articles such as pharmaceuticals (tablets, capsules, etc.), small cookies, candies, washers, button batteries, which are especially suited to visual inspections of those articles to be transported.

There are conventional transporting devices, for example, disclosed in (1) Japanese Patent Publication No. 035789/1982 and (2) Japanese Patent Publication No. 032125/1983, which are both associated with visual inspection of pharmaceutical tablets.

In the transporting device disclosed in Publication (1), a horizontal turntable is located in a stage following means arranging pharmaceutical tablets into substantially a straight line. The peripheral part of this turntable is constructed as a transparent loading surface, onto which the pallets aligned by the aligning means are successively fed in such a manner that upper and bottom surfaces and both sides (left and right) of individual loaded tablets are scanned by a television camera identifying the presence or absence of visual defects. The transparent loading surface contributes to enabling the bottom side of the tablet to be inspected. This device has an advantage which allows inspections with high precision of both left and right tablet side surface, because the major part of the bottom side of the individual tablet is kept at a distance from the loading surface. However, individual tablets just put on the transparent loading surface tend to deviate frequently from their normal running route under a centrifugal force of the turntable, preventing a precise visual inspection. Moreover, there is an important limitation to the transporting architecture, because any running route of the tablets should remain always in a certain horizontal plane, inhibiting any vertical transportation.

On the other hand, the transporting device disclosed in Publication (2) is provided with a plurality of pockets on the outer peripheral surface of a suction type rotary drum, the pockets being connected with the drum inside so that respective tablets in the pockets rotating together with the drum can be inspected. There are several disadvantages found for this device, i.e. the tablets may be damaged or broken sometimes by their forced contact with the pocket edges or bottoms when they enter the pockets or the transporting route may be stuffed by tablet jammings (congestions, crowdedness). Furthermore, this device requires a larger floor space for installing the rotary drum, as with the device described in Publication (1).

SUMMARY OF THE INVENTION

A main object of this invention is to provide a transporting device, which prevents any deviation of articles to be transported such as pharmaceutical tablets from their normal running route.

Another object of this invention is to provide a transporting device, which gives no impact effect on the articles to be transported, consequently avoiding any tablet from fracture or damage and further shuts out any possibility of stuffing due to tablet jamming.

Still another object of this invention is to provide a transporting device with higher freedom for the transporting architecture.

A further object of this invention is to provide an inspection device, which realizes visual inspections with high speed and high precision of articles to be transported, utilizing the above described transporting devices.

The above objects of this invention can be achieved by a transporting device suitable for inspecting articles to be transported, which comprises a pair of opposed plates providing a slit between their outer edges and making their edges at the least, movable along the slit; and a suction means, which sucks air through the slit into the inside of the opposed plates, holding the articles onto the edges under the suction force. Therefore, the articles to be transported such as tablets are kept by suction on the edges of the pair of the opposed plates and successively transported by the movable edges into the inspection stage, without any deviation from their specified normal running route.

Moreover, the other objects of this invention is achieved by an inspection device comprising first and second transporting devices, which comprise a pair of opposed plates which provide a slit between their outer edges and make their edges at the least, movable along the slit in order to transport the articles, and a suction means which sucks air through the slit into the opposing inside of the pair of the opposed plates, so as to hold the articles on the afore mentioned edges, the transport end position of the articles at the slit of the first transporting device keeping a distance equal to or greater than the standing height of the articles during their transportation against the transport start position of the articles at the slit of the second transporting device so that the articles can be smoothly transferred from the first to the second transporting device; and a first and second visual inspection means of the articles provided in a position near to each slit of the first and second transporting devices. Therefore the articles held by the suction effect on the edges of the opposed plates in the first transporting device are fed through the first visual inspection means for the required inspection, then the suction surface is reversed by the transfer of the articles from the first to the second transporting device, therefore, the articles are inspected that reversed condition by the second visual inspection means, assuring the inspection of the entire surfaces of the articles as the result.

BRIEF DESCRIPTION OF THE DRAWINGS

FIG. 10 is a block diagram showing an inspection means in the inspection device according to this invention, FIG. 18 is a flow chart showing operations of the high speed processor, while FIG. 19 is a timing diagram in the operations of the same, FIG. 20 is a block diagram showing construction of a host computer.

DETAILED DESCRIPTION

Figure 1:
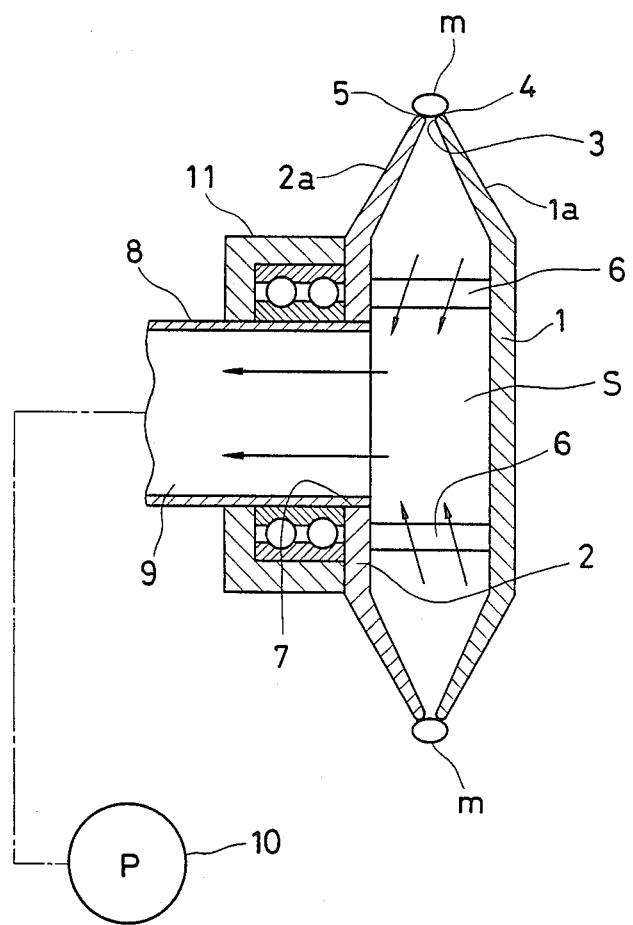
FIG. 1 is a sectional view showing a transporting device of a preferred embodiment of this invention.
Figure 2:
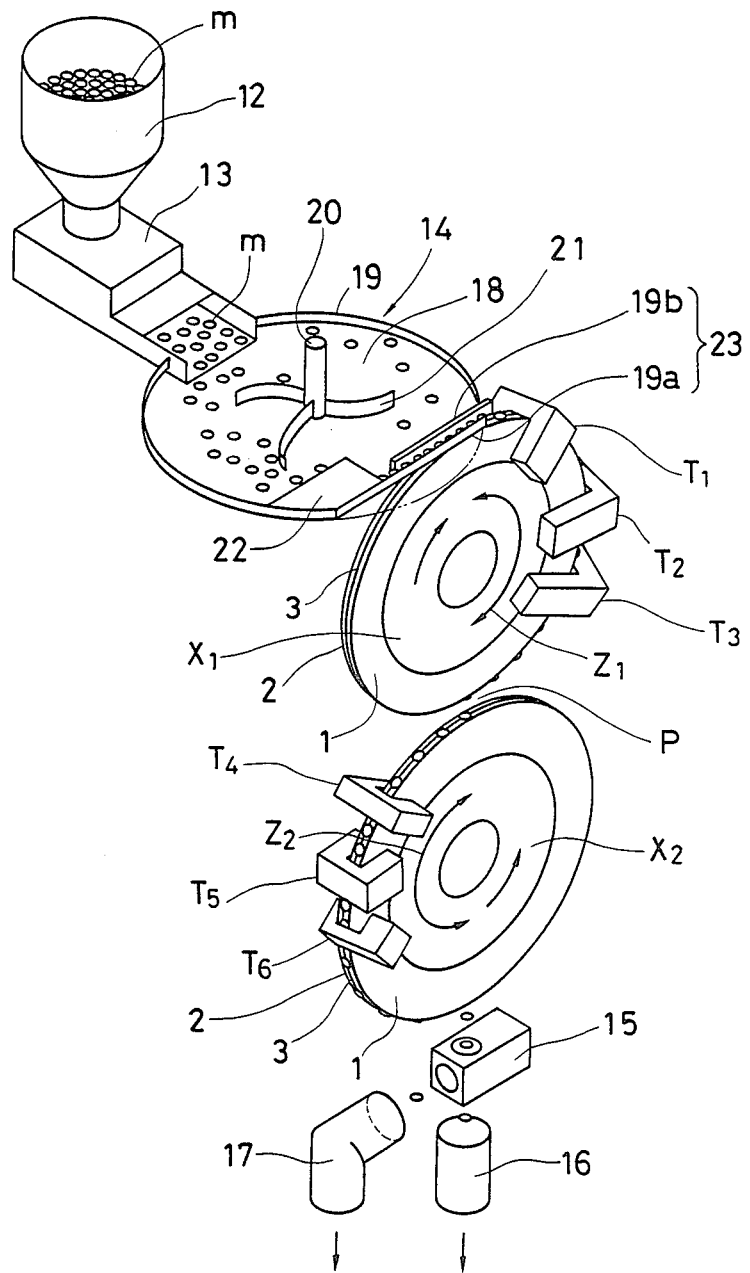
FIG. 2 is a perspective view showing a visual inspection device utilizing the transporting device shown in FIG. 1.
Figure 3:
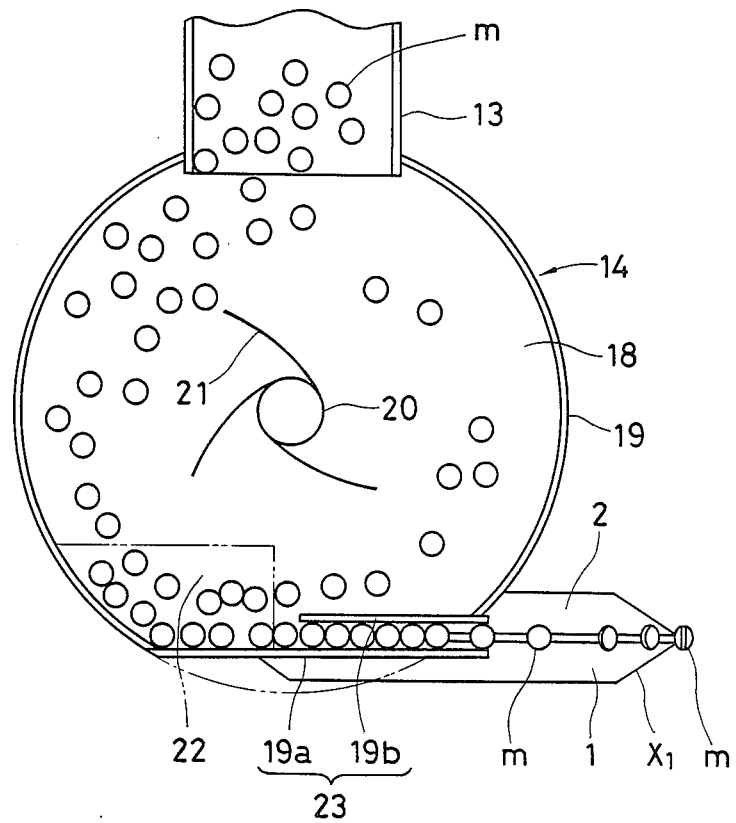
FIG. 3 is a grossly enlarged plan view showing the article aligning part shown in FIG. 2, FIGS. 4A to 4C are explanatory views respectively showing other visual inspection devices for pharmaceutical tablets.

An embodiment of this invention is shown in FIGS. 1 to 3. In FIG. 1, there is a pair of dish-like rotary discs 1 and 2, which are opposed to each other and extend outwardly in a horizontal direction and produce a clearance, i.e. slit 3, narrower than the dimension of articles m to be transported between their outer edges 4 and 5, the slit 3 being continuously distributed along the entire peripheries. One side of the articles m to be transported is brought into contact of the outer edges 4 and 5 of the disc 1 and 2.

The respective disc 1 and 2 are jointed together by a plurality of spacers 6 distributed at opposed positions in a peripheral direction in order to keep a certain gap of the slit uniformly along the entire periphery. A rotary disc 2 is provided with a center hole 7, which is fitted hermetically with a horizontal rotating shaft fixed coaxially with the rotary discs 1 and 2. The inside of the rotating cylindrical shaft 8 gives a suction path 9 of which one end is leaded through the inside space S between the pair of the rotary discs 1 and 2 to the slit 3 and the other end is leaded directly to a suction pump 10. When operated, the suction pump 10 generates under pressure showing suction effect acting from the slit 3 between the rotary discs 1 and 2 to their inside space, and therefore the articles m to be transported are kept by suction on the outer edges 4 and 5 of the rotary discs 1 and 2. Moreover, another suction means may be applied instead of the suction pump 10.

The cylindrical shaft 8 is supported rotatably by a ball bearing 11 in a frame (not shown), and is connected through a speed reduction mechanism with a driving source such as a motor (not shown) in order to drive the pair of rotary discs 1 and 2. Moreover, a mechanical scraper, a suction device or a blow off device (not shown) may be provided at a prescribed position in the rotating route of the edges 4 and 5 so that the articles m may be detached from them. Furthermore, it is possible to adjust the frictional coefficient of the outer edges 4 and 5 according to the nature of the articles m to be transported or their transporting purposes, etc.

When the suction pump 10 is actuated in the transporting device mentioned above, underpressure is generated under the suction force of the pump in the slit 3 through both the suction path 9 and the inside space S, producing ambient air flow into the slit 3. If the articles m to be transported are brought near to or into contact with the slit 3, the underpressure presses them forcedly on the edges 4 and 5 of the rotary discs 1 and 2. Then, the driving source is actuated to rotate the shaft 8, which drives the rotary discs 1 and 2 in turn for transporting the articles m. Even if the rotary discs 1 and 2 are driven at higher speed, a corresponding suitable increase of the suction force may prevent any falldown of the articles m from the edges 4 and 5, assuring expected transportation on their normal running route in a specified vertical plane.

The pair of rotary discs 1 and 2 has the inclined parts 1a and 2a extending to the corresponding edges 4 and 5, forming a V-shaped configuration, so that the inside gap expands in proportion to the distance from the slip 3. Therefore, the gap dimension of the slit 3 can be selected sufficiently narrow while almost all profiles of the articles m are projected out of the edges 4 and 5, preventing substantially any falling down of them into the slit 3.

Furthermore, the tops of the edges 4 and 5 of the rotary discs 1 and 2 are very thin in their thickness, resulting in reduced air flow resistance at the slit 3. Therefore, the increased suction force can assure an automatic centering of the articles m on the slit 3.

When the articles m reached a separating device located at a specified point on the running route of the edges 4 and 5, they are released free from the suction effect and consequently detached from the edges 4 and 5. The articles m may be detached at any timing during 1 turn of the rotary discs 1 and 2 or turned several times together with these discs. It is also possible to substitute the rotary discs 1 and 2 with another angular or elliptic opposed plates.

FIG. 2 is a perspective view showing a visual inspection device for pharmaceutical tablets, which incorporates the transporting devices shown as the above embodiment, while FIG. 3 is a grossly enlarged plane view showing the aligning mechanism. The articles m, e.g. pharmaceutical tablets, are charged into a hopper 12, which is provided at its bottom with a vibrating feeder 13 for discharging successively a small lot of the articles m, while an aligning mechanism 14 is attached to the leading end of the vibrating feeder 13. The aligning mechanism 14 comprises first transporting device $X_1$ the second transporting device $X_2$ in a vertical direction, and the device also includes a sorting mechanism 15 for tablets, a recovery duct 16 for accepted tablets and another recovery duct 17 for rejected tablets positioned beneath the second transporting device $X_2$. The first transporting device $X_1$ is provided with visual inspection mechanisms $T_1$ to $T_3$, while the second transporting device $X_2$ is provided with inspection mechanisms $T_4$ to $T_6$.

The aligning mechanism 14 for tablets comprises a driven turntable 18, a fixed peripheral wall 19 in sliding contact with the outer edge of the turntable 18, a fixed shaft 20 extending through center of the turntable 18, a plurality of aligning guides 21 in sliding contact with the loading surface of the turntable 18 mounted on the fixed shaft 20, a thickness gate 22 attached to the upper edge of a peripheral wall 19 opposed to the vibrating feeder 13, and a width gate 23 consisting of a straight peripheral wall 19a as a portion of the peripheral wall 19 and another straight peripheral wall 19b as another portion of the peripheral wall 19 positioned inwardly in parallel to the straight peripheral wall 19a.

The articles m fed through the vibrating feeder 13 onto the turntable 18 are aligned successively in a single row along the peripheral wall 19, under actions of the turntable 18 and consequently the aligning guide 21. Arriving at the thickness gate 22, the tablets m are sorted by the gate 22 with respect to a thickness, the tablets thinner than the prescribed thickness value being passed through the thickness gate 22 to the width gate 23, where the tablets m are sorted with respect to a width, the tablets m narrower than the prescribed width value being passed through the width gate 23 onto the first transporting device $X_1$.

The upper edge of the slit 3 in the first transporting device $X_1$ is located just below an outlet of the width gate 23, while the gantry-shaped visual inspection mechanisms $T_1$ to $T_3$ are attached to a fixed frame (not shown), so as to sandwich the rotary discs 1 and 2 of the first transporting device $X_1$. Similarly, additional gantry-shaped visual inspection mechanisms $T_4$ to $T_6$ are attached to another fixed frame (not shown), so as to sandwich the rotary discs 1 and 2 of the second transporting device $X_2$.

All of these inspection mechanisms $T_1$ to $T_6$ incorporate a light source (not shown) to irradiate light beams on to the tablets m to be transported, which are kept by suction on the both edges 4 and 5 of the slit 3, a television camera (not shown) for photographing the irradiated tablets m and a counter (not shown), which controls the timing for sorting the tablets m into accepted or rejected lots in the tablet sorting device 15 as described below. The details of the inspection mechanisms will be described below.

In the second transporting device $X_2$, the upper end of its slit 3 is located at a position just below the bottom end of the slit 3 of the first transporting device $X_1$. This location indicated as P becomes the delivery point of the articles m to be transported. The shaft center of the first transporting device $X_1$ is parallel with that of the second transporting device $X_2$, and slit 3 of the former and the slit 3 of the latter are positioned in the same vertical plane. The first transporting device $X_1$ and the second transporting device $X_2$ have the same constant rotating speed although their rotating detections are reversed.

The articles m kept by suction on the edges 4 and 5 of the first transporting device $X_1$ are turned upside down during their transfer at the delivery point P onto the edges 4 and 5 of the second transporting device $X_2$. The above delivery is accomplished smoothly under the suction force of the second transporting device $X_2$ and the gravitational effects of the articles m. The angular range indicated by the arrow mark $Z_1$ in FIG. 2 is a suction zone of the first transporting device $X_1$, while the angular range indicated by the arrow mark $Z_2$ is a suction zone of the second transporting device $X_2$.

Each inspection mechanism $T_1$, $T_2$ and $T_3$ is constructed for photographing the upper surface, right side surface and left side surfaces of each article m and transmitting the video signals obtained to a television monitor and an analyzer (both not shown), while another inspection mechanism $T_4$, $T_5$ and $T_6$ is constructed for photographing the bottom surface (becoming a top surface after being turned upside down), right side surface and left side surface of the articles m and transmitting the video signals obtained to the above mentioned television monitor and the analyzer.

The analyzer compares the visual data of the passing articles m transmitted from the respective television cameras with their specified reference data, judges the actual data as acceptable or rejected, and transmits the acceptable data or the rejected data to a sorting mechanism 15, which classifies the articles m into an acceptable lot or a rejected lot according to the corresponding data transmitted from the analyzer. The sorting mechanism uses air blowing from a blower or the like to feed the acceptable articles m into a recovery duct 16 for acceptable articles when they arrive at the sorting mechanism 15, while the rejected articles m arriving at the sorting device are discharged into another recovery duct 17 for rejected articles.

The blower mentioned above performs an ejector action which can suck the articles m out of the second transporting device $X_2$ and feeds them into the sorting mechanism 15.

In case of this visual inspection device, a significantly wide area range extending from the side to bottom of the tablets m kept by suction on the edges 4 and 5 of the first transporting device $X_1$ and the second transporting device $X_2$ are exposed to the outside and consequently sufficient light is available to irradiate or photograph the tablets m under transportation by the television cameras.

Moreover, since the articles m are turned upside down during their delivery or transfer from the first transporting device $X_1$ onto the second transfer device $X_2$, both top and bottom surfaces of the articles m to be transported can be inspected thoroughly in both of the first transporting device $X_1$ and the second transporting device $X_2$ respectively.

The advantages achieved by this embodiment are summarized as follows:

(a) When brought near to or into contact with the edges 4 and 5 forming the slit 3, the articles m to be transported are kept by suction due to underpressure effect on the edges 4 and 5, so that they can keep their set positions on the edges 4 and 5 even under other effort of the external force such as centrifugal forces and vibration, preventing their deviation from the normal travelling route.

(b) With holding by suction on the edges 4 and 5, a major portion in the surfaces of the articles m is exposed out of the edges 4 and 5. Therefore, a significantly wide surface area of the articles m can be subjected to the required inspections.

(c) The holding by suction effect is utilized for positioning the articles m to be transported. Therefore, any mechanical effect acting on the articles m to be transported is mild and free from shock. That is to say, there is no risk of damage, fracture or stuffing due to jamming for the articles m to be transported, resulting in their transportation with high efficiency.

Figure 4A:
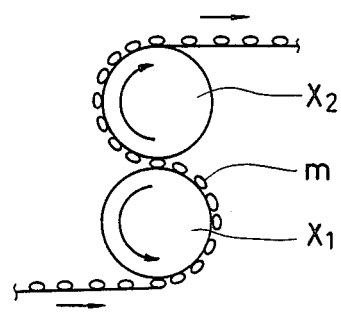
Figure 4B:
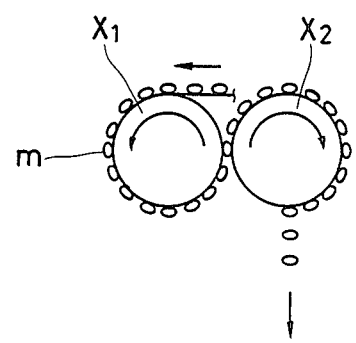
Figure 4C:
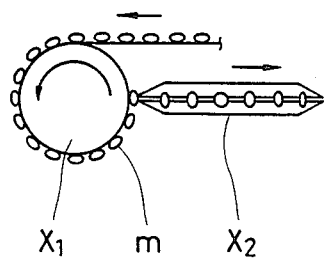

The modified arrangement of the first and the second transporting devices $X_1$ and $X_2$ is shown in FIGS. 4A to 4C.

In FIG. 4A, the second transporting device $X_2$ is located above the first transporting device $X_1$ in order to transport the articles m upwards, while FIG. 4B shows the first transporting device $X_1$ positioned transversely in parallel with the second transporting device $X_2$. Furthermore, in FIG. 4C, the first transporting device $X_1$ is crossed with the second transporting device $X_2$.

Though inspections in the arrangement as shown in FIG. 2 are limited only to top and bottom surfaces and left and right side surfaces of the articles m to be transported, the crossed arrangement as shown in FIG. 4C has an advantage that the both front and rear surfaces of the articles m can be added for required inspections.

Figure 5:
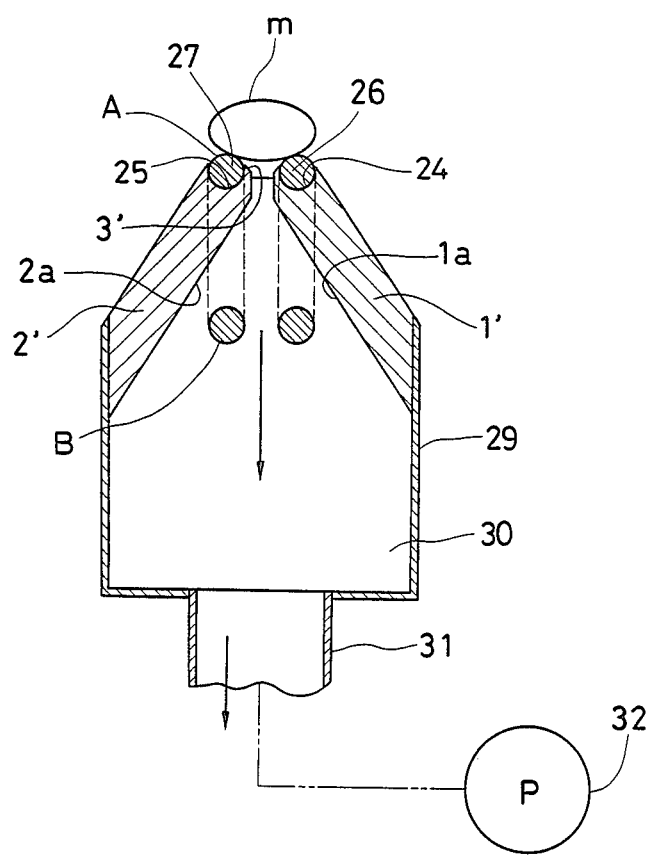
FIG. 5 is a sectional view showing a transporting device of another embodiment of this invention.

Additional embodiments according to this invention are shown in FIGS. 5 to 8. As shown in FIG. 5, a pair of fixed opposed plates 1' and 2' are provided at their upper peripheries with concave guide rails 24 and 25, with guide strings 26 and 27 acting as movable edges for transporting the articles m along the fixed plates 1' and 2'. Also, a slit 3' is formed between the strings 26 and 27.

The bottom ends of the fixed plates 1' and 2' described above are connected with the upper part of an air box 29, which provides a suction path 30 in its interior, while the suction path 30 of the air box 29 is connected through a suction tube 31 with a suction pump 32. The air box 29 is kept hermetically sealed everywhere, except only a slit 3' opened to the outside.

Figure 6:
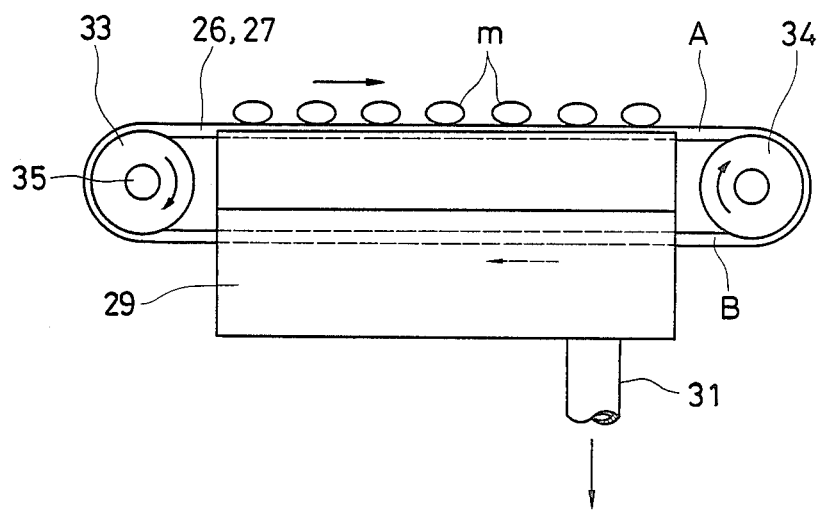
FIG. 6 is a front view of the transporting device shown in FIG. 5.

As shown in FIG. 6, the respective transporting strings 26 and 27 such as rubber belts having a circular section, are stretched between a pair of pulleys 33 and 34. One pulley 33 is a driving pulley having a driving shaft 35 connected through a speed reduction mechanism with a motor or other driving mechanism (not shown), while the other pulley 34 is a driven pulley.

The respective transporting strings 26 and 27 being endless, the forwarding route A of the strings 26, 27 is engaged with the guide rails 24 and 25. While the return route B passes through the suction path 30 of the air box 29. The inner surfaces 1a and 2a of the fixed plates 1' and 2' are tapered for expanding the space gap between them in proportion with the distance from the slit 3', reducing air flow resistance at the slit 3' as the result. Moreover, it is possible to detach the articles m from the transporting strings 26 and 27, positioning an appropriate separating mechanism (not shown) such as a mechanical scraper, suction mechanism or blowdown mechanism at a specified position on the travelling routes. It is also possible to adjust the frictional coefficient acting on the suction surfaces for the articles m, according to their nature, transporting purposes and other factors.

In this embodiment, the articles m are transported along the forwarding route A of the strings 26 and 27 under their constant holding by suction on the strings 26 and 27. The guide rails 24, 25 are engaged with substantially half of the transporting strings 26 and 27 so that the travelling routes of the transporting strings 26 and 27 are maintained and their wringing to each other, i.e. drop of the expected suction effect, can be prevented. Further, when the return route B of the transporting strings 26 and 27 passes through the air box 29, dust deposits on the strings 26, 27 can be removed by suction effects, i.e. they are cleaned effectively. Of course, the straight horizontal travelling routes of the transporting strings 26 and 27 may be replaced with any straight vertical, curved, inclined route and/or combinations of the same.

Such a transporting device has similar advantages, as pointed for the transporting device in FIG. 1 mentioned above and furthermore the application of the transporting strings 26 and 27 simplifies arbitrary extension of their route lengths, while excessive increase of the installation space as required in case of the turntable can be avoided, providing a valuable advantage of space saving. The transporting strings are light-weight with low consumption of driving energy and less expensive, resulting in decrease of overall costs.

Figure 7:
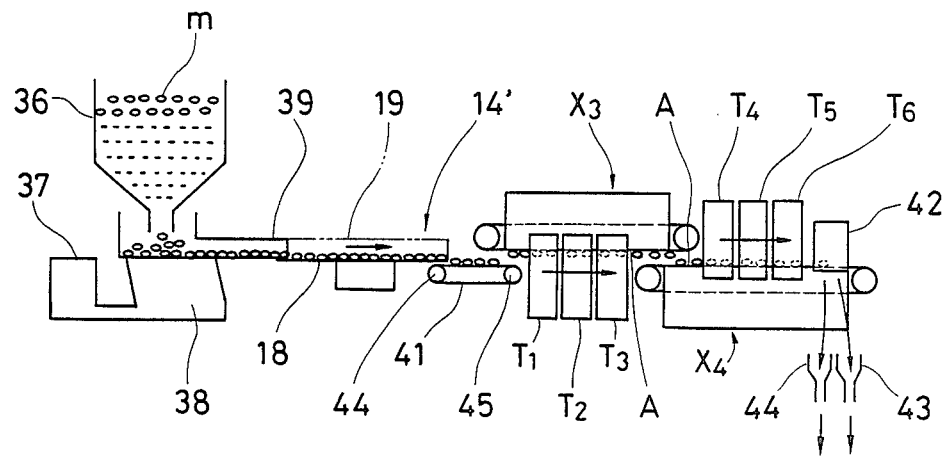
FIG. 7 is a front view showing outline of a visual inspection device for pharmaceutical tablets, which is provided with the transporting device shown in FIG. 5.
Figure 8:
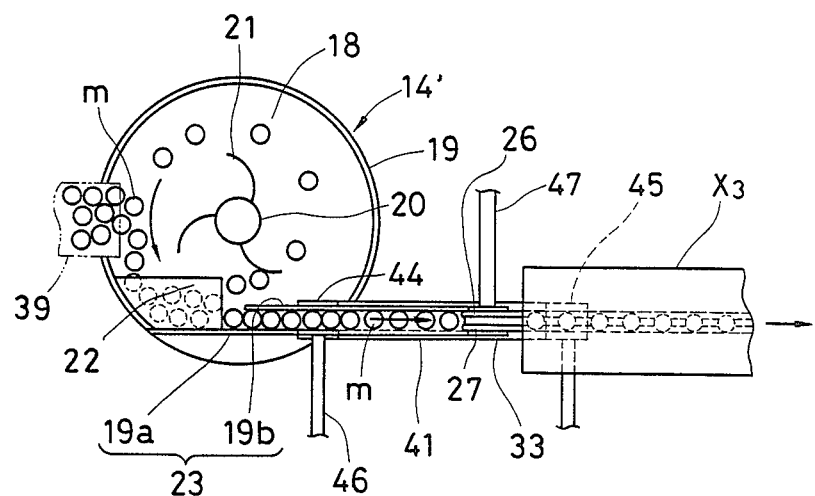
FIG. 8 is a grossly enlarged plan view showing the alligning part and a portion in the transporting device.

FIG. 7 shows a visual inspection device for tablets provided with the transporting devices of this embodiment, wherein a hopper 36, a vibrating feeder 37 with a vibrator 38, a vibrating through 39 turntable 18, a tablet aligning mechanism 14', a belt conveyor 14, first transporting device $X_3$, second transporting device $X_4$ and a tablet sorting mechanism 42 are arranged successively along a horizontal transporting direction of the articles m; there are a recovery duct 43 for acceptable tablets and another recovery duct 48 for rejected tablets, which are located below the tablet sorting mechanism 42.

The tablet aligning mechanism 14' is nearly the same as described in FIG. 3, therefore, the same symbols are applied, omitting the detailed description. Moreover, the belt conveyor 41 is located just below and stretched between the pulleys 44 and 45, with shafts 46 and 47 being their driving shafts respectively.

The belt conveyor 41 is provided with an automatic correcting function (accumulator function) which avoids any irregular aligned pitch of the articles m to be transported in the tablet aligning mechanism 14', namely, the rotating speed at the peripheral part of the turntable 18 is set at a level higher than that of the belt conveyor 41. Therefore, little or no void portions in the row of the tablets m takes place, resulting in a satisfactory feeding condition.

The forwarding route A of the transporting strings 26 and 27 is located at a lower side in the first transporting device $X_3$, while the forwarding route A of the transporting strings 26 and 27 is located at the upper side in the second transporting device $X_3$.

The first transporting device $X_3$ has the transport start portion of the slit 3, which is located above the belt conveyor 41, and gantry-shaped visual inspection mechanisms $T_1$ to $T_3$ are attended to a fixing frame (not shown), so as to sandwich a pair of the fixed plates 1' and 2' of the first transporting device $X_3$. In the second transporting device $X_4$, the transport start portion of its slit 3' is located just below the transport end portion of the first transporting device $X_3$. The distance between the first transporting device $X_3$ and the second transporting device $X_4$ is equal to or greater than the standing height dimension of the articles m during their transportation and set in a range where the suction force of the second transporting device $X_4$ is active. In the distance exceeding the above range, the suction effect of the second transporting device $X_4$ and the gravitational effects are not sufficient to receive the articles m from the first transporting device $X_3$.

The gantry-shaped fourth to sixth visual inspection mechanisms $T_4$ to $T_6$ are attached to a fixing frame (not shown), so as to sandwich the fixed plates 1' and 2' of the second transporting device $X_2$. These inspection mechanisms $T_1$ to $T_6$ are the same as described in FIG. 2, therefore, further descriptions will be omitted here.

The first transporting device $X_3$ and the second transporting device $X_4$ are operated at the same constant speed.

Figure 9A:
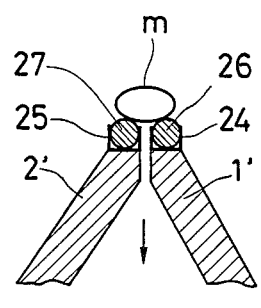
FIGS. 9A to 9C are fragmentary sectional views showing other movable strings respectively.
Figure 9B:
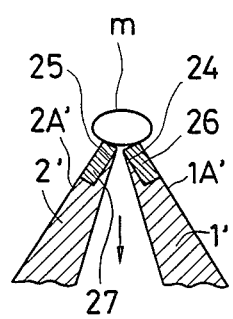
Figure 9C:
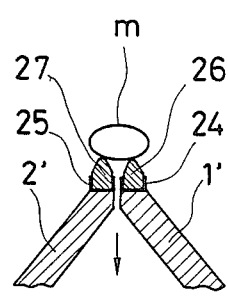

It is possible to apply a variety of the first and second transporting devices $X_3$ and $X_4$ as shown in FIGS. 9A to 9C in addition to FIG. 7.

FIG. 9A shows devices comprising the guide rails 24 and 25 jointed to the fixed plates 1' and 2', which are featured with simplified manufacturing steps. Moreover in FIG. 9B, tapered surfaces 1'A and 2'A located outside of the fixed plates 1' and 2' are provided with guide rails 24 and 25 having the same inclination, while the transporting strings 26 and 27 are constructed of a flat belt and associated with the corresponding guide rails 24 and 25. In this case, the transporting strings 26 and 27 are not detached unexpectedly from the guide rails 24 and 25 and the contact between the articles m to be transported and the strings 26 and 27 becomes substantially a line contact, therefore, improving the floating tendency of the articles m from the strings 26 and 27.

In FIG. 9C, the guide rails 24 and 25 are jointed to the fixed plates 1' and 2', and engaged with the transporting strings 26 and 27 having pointed tops, improving the floating tendency similarly.

Moreover, the following modifications may be applied for all of the afore mentioned embodiments.

(I) The vibrating feeders 13 and 37 and the aligning mechanisms 14 and 14' may be replaced with a vibrating bowl feeder, a traversing funnel-shaped hopper feeder or a coil shute. As an aligning mechanism, the turntable system is preferred for circular articles, however, articles m with unround profiles such as a rugby ball can be better handled by the vibrating bowl feeder or the coil shute.

(II) The transportation in single row of the articles m may be switched to the transportation in a plurality of rows, which are parallel or crossed.

(III) The gap dimension of the slits 3 and 3' may be adjustable, assuring an easy adaptation to any size alteration of the articles m to be transported.

(IV) The pair of the transporting strings 26 and 27 may be driven with a certain speed difference instead of driving at the same speed, so that each of the articles m are is rotated around its own center axis and influence of the speed difference, exposing its entire peripheral surfaces uniformly and repeatedly to the required inspections.

(V) Possible alternatives of the sorting mechanisms 15 and 42 are mechanical sorting means such as a solenoid push system and a vane wheel with pulse motor and pneumatic sorting means such as suction air and jet air.

(VI) The speed relation between the transporting strings 26 and 27 and the belt conveyor 41 may be preset arbitrarily according to the type of the articles m to be transported. If the transporting strings 26 and 27 are driven at higher speed, the pitch of the articles m to be transported is increased at the delivery point from the belt conveyor 41 onto the transporting strings 26 and 27. There is no change of the pitch in case of the same speed driving of the strings 26 and 27. When driven at lower speed, the pitch of the articles m is decreased reversely at the delivery point, supplying a continuous chain of the articles m contacted together.

(VII) The belt conveyor may be omitted in such manner that the articles m are supplied from the width gate 23 directly to the first transporting device $X_3$.

Hereafter, the visual inspection mechanism will be described in detail. As shown in FIG. 10, this visual inspection mechanism comprises a plurality of inspection systems $SY_1$, $SY_2$ ... $SYx$ and a host microcomputer MC connected with these inspection systems $SY_1$ ... $SYx$, wherein the data from the plurality of the inspection systems $SY_1$ ... $SYx$ are input to the host microcomputer MC, which judges the data from the points of overall views and outputs its judgment results as signals for driving a sorting mechanism.

The inspection system $SY_1$ is constructed from a line image sensor 50 used for high-speed line scannings and photographings of the articles m such as pharmaceutical tablets to be transported; a video characteristics extraction circuit 51 which exchanges video signals, scanning clocks and line scanning synchro signals with the image sensor 50 and outputs the characteristics data related with the articles m to be transported; and a high-speed processor 52 which receives and processes the characteristics data from the video characteristics extraction circuit 51.

In the above inspection system $SY_1$, surfaces of the articles m transferred through the transporting device X are photographed by the line image sensor 50, which outputs the video signal, which has a level corresponding to the surface brightness of the articles m, to the video characteristics extraction circuit 51, while the transporting device X is enabled to compare sufficiently the brightness of the articles m to be transported with a specified reference value.

The video characteristics extraction circuit 51 prepares characteristics signals of monodimensional images for the articles m through respective analog circuits of noise filtration, amplification, integration and differentiation, starting from the output image signals of the line image sensor 50 and inputs its output through a digital circuit of characteristics data per line necessary for processing inspection judges related with width of image pattern, number of change, change address, integration data, etc. to the high-speed processor 52, while the video characteristics extraction circuit 51 gives at the same time line scanning synchro signals and scanning clocks to the line image sensor 50.

The high-speed processor 52 is equipped with a high-speed accessible ALU (arithmetic and logic unit), memories and input/output controllers, executes at high-speed acceptance judgements (acceptable or rejected) of the articles m and countings of the characteristics points according to a parallel processing program stored in the memories, starting from the output characteristics data per line of the video characteristics extraction circuit 51, and then transmits the acceptance judgment of each article, its profile characteristics data such as area value and others to the host computer MC.

The other inspection systems $SY_2$, $SY_3$ ... Sx being constructed in the same way as like as the above inspection system $SY_1$, these inspection systems $SY_1$ to $SYx$ transmit photographing data from different viewing directions for the same articles m transported to the host microcomputer MC, which is equipment with CPU, memories and input/output controllers, executes a selective drive control of the articles m according to the output of their acceptance judgment from the high speed processor 52, decides a reference value for the profile acceptance judgement through its own self-learning function of profile characteristics data such as area value, and compares actual profile characteristics data with the reference value, whereby the host microcomputer MC is connected with the plurality of the inspection systems $SY_1$ to $SYx$ and it executes overall judgement of the data from the respective inspection systems $SY_1$ to $SYx$. The plurality of the inspection systems is not necessarily required and only one inspection system may be applied in some cases.

In these visual inspection, the video characteristics extraction circuit 51 generates in real time the image characteristics data (number of changes, number of differentiation changes, change address, integration value, peak value, pattern length of the articles, etc.) per line of the articles m as the basis for judge processing of inspection results, so that the required judge processings based on the above characteristics data are carried out within at least scanning time interval of one line in the high-speed processor 52. The judgement processings are executed through successive addressings of command codes stored in memories of the high-speed processor 52. Therefore, the processing contents can be easily altered by alteration or addition of the programs to be used, promising wide universal applications and simplfied problem solvings for complicated processings through mere program settings.

After scanning full surfaces of the articles m, the image information judged and accumulated for each line is transmitted to the host microcomputer MC for the overall judgement. The information transmitted to the host microcomputer MC includes area value and acceptance judgement of the articles m, and the area value and others are processed and applied also for the self-learning purpose mentioned above of the reference value setting. In that case, the image processings for inspection judgement are carried out by the high speed processor 52, therefore, the load on the host microcomputer is reduced and a low-priced universal microcomputer (for example, single board) can be used as an alternative of the host microcomputer MC.

Figure 11:
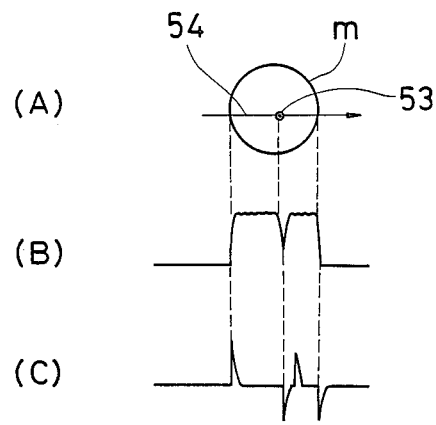
FIGS. 11, 12, 13A and 13B are explanatory view showing the visual inspection procedures.

One example of the visual inspection for pharmaceutical tablets as the articles m will be described. Surface defects such as stains, impurity deposits, scratches, etc. of the tablet are inspected. As shown in FIG. 11, when an impurity 53 deposited on the article m is photographed along the line 54 by the line image sensor 50, the sensor 50 gives the image signal showing a level dropdown as shown in FIG. 11 (B) due to change of light reflection from the surface occupied by the impurity 53 which image signal shows after its differentiation peaks corresponding to edges of the article m and the impurity 53, therefore, the presence of the impurity 53 increases the number of peaks in comparison with that of acceptable articles m, indicating applicability of this peak comparison for identifying the impurity 53.

Figure 12:
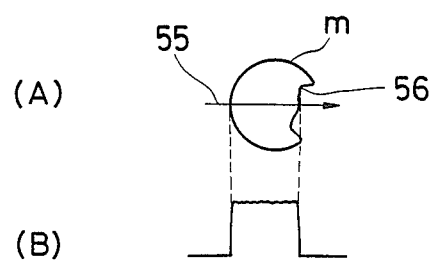

If non-acceptable shape defects such as chipping, cracks, etc. of the tablets should be scanned, a chipping 56 as shown in FIG. 12 (A) of the article m produces the image signal as shown in FIG. 12 (B) along the line 55 from the line image sensor 50, and the pattern length of the article m is shortened, therefore, the chipping 56 can be detected through comparison of entire pattern length value (area value of the tablet) of the article m to be inspected with the area value of acceptable tablets.

Figure 13A:
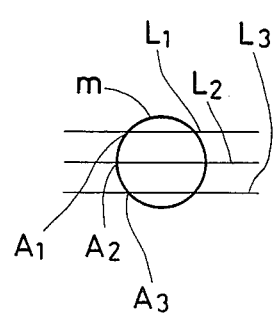
Figure 13B:
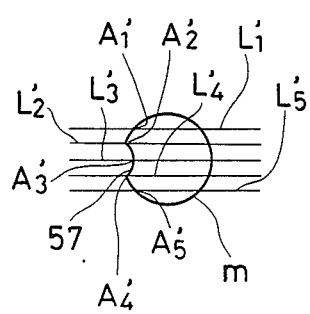

Furthermore if a minute shape deviation of the tablet should be detected, edge position of the article m is identified as shown in FIGS. 13A and 13B for each of the scanning lines $L_1$ to $L_3$ in order to judge the shape deviation part 57 according to the value shifted from the edge position of a neighboring line. In other words, the edge address of the preceding scanning line is compared with that of the current scanning line, and then the trend (increase or decrease) of the edge address is utilized for detecting the defects. If the round article m transported has a normal shape as shown in FIG. 13A, the edge addresses in left side $A_1$, $A_2$ and $A_3$ of each scanning line $L_1$ to $L_3$ satisfy the following relations:

$A_1 > A_2$ and $A_3 > A_2$

When the articles m to be transported are scanned successively, the edge address in the left side of each scanning line continues to be decreased until the scanning line passes through the center of the articles m and then increases reversely, the polarity of the edge address change in at the left side being switched only once from a negative to a positive value.

If the article m has a minute shape deviation 57 as shown in FIG. 13B, the polarity of difference of the edge address $A_1'$ to $A_5'$ in left side of each scanning line $L_1'$ to $L_5'$ is switched 3 times in the order of negative→positive→negative→positive. Therefore, the shape deviation of the article m can be identified by comparing the number of polarity changes of difference with the reference value (once).

Because the integration values are proportional to the brightness of the articles m to be transported, average unit brightness is obtained through accumulation of the integration values in each line, and compared with the acceptable standard. Furthermore, if there are patterns, influencing the brightness distribution of the items to be inspected, the acceptance judgement is executed according to the number of changes related with the integration values obtained between respective lines.

The construction and operation of each block in the visual inspection mechanism shown in FIG. 10 will now be described.

Figure 14:
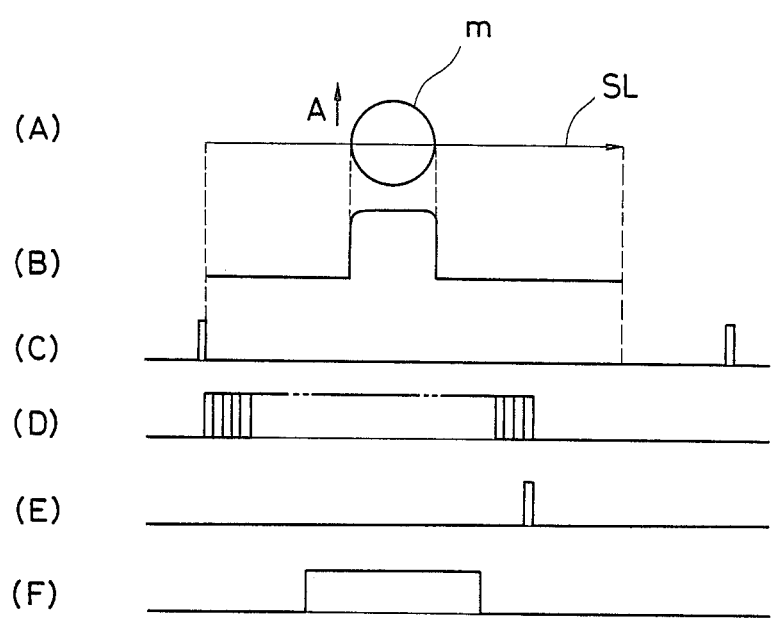
FIG. 14 is a signal timing chart.

Based on line scanning signals (FIG. 14 (C)) and scanning clocks (FIG. 14 (D)) from the video characteristics extraction circuit 51, the line image sensor 50 takes, as shown in FIG. 14 (A), a photograph on line SL of the articles m, which are being transported with a constant speed in the direction indicated with the arrow mark A through the transporting device, and outputs video signals per line, as shown in FIG. 14 (B). In this circumstance, the surface of the articles m is white in color, while the background, i.e., the surface of the transporting device, is black in color, whereby the video signals become high level at the pattern of the article m and low level at the background.

Figure 15A:
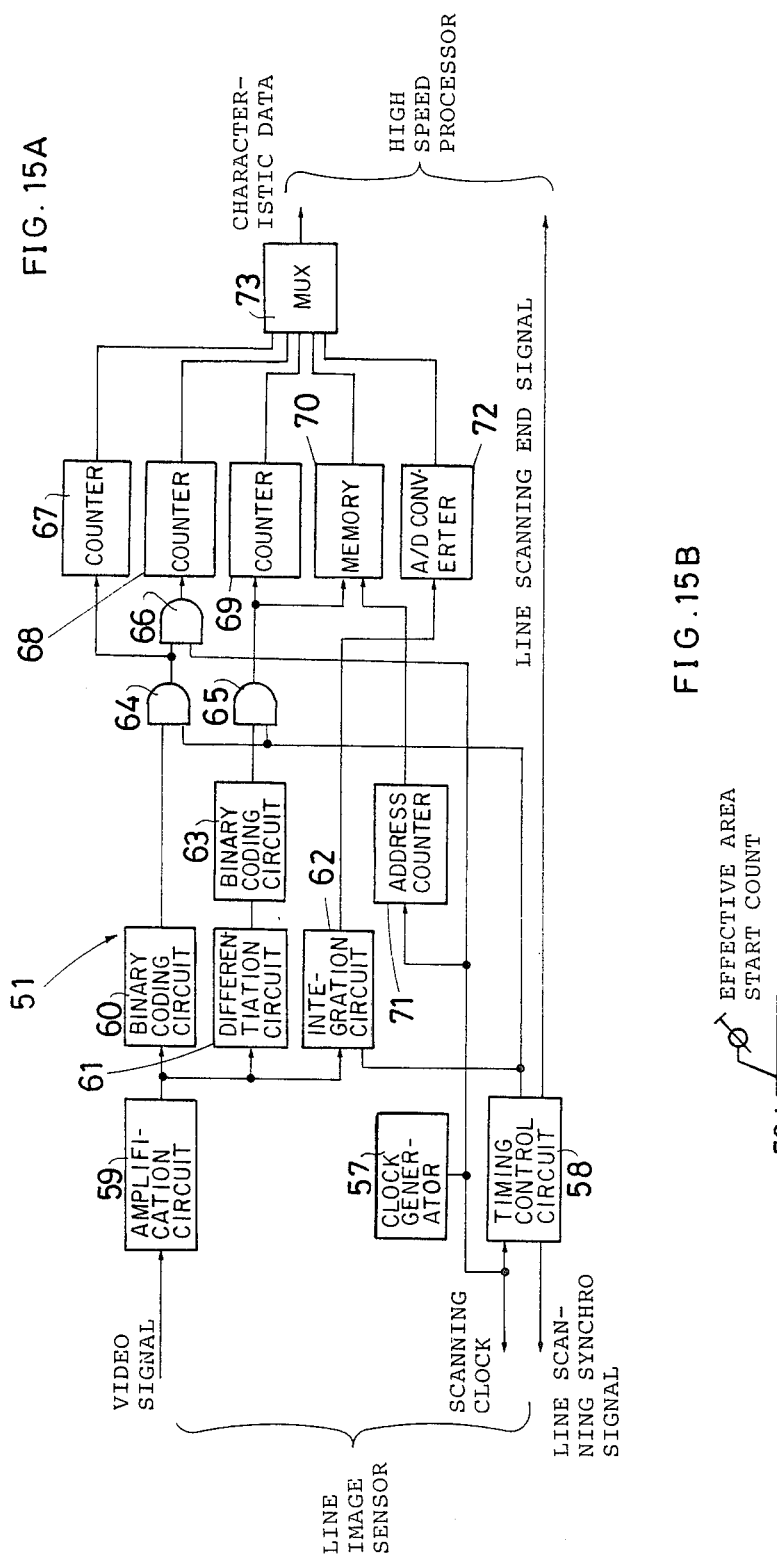
FIG. 15A is a detailed block diagram showing a video characteristics extraction circuit.

FIG. 15A is a detailed block diagram showing the video characteristics extraction circuit 51, which generates through a clock generator 57 a scanning clock as shown in FIG. 14 (D) and gives this scanning clock to the line image sensor 50 and the timing control circuit 58.

The timing control circuit 58 produces line scanning synchro signals as shown in FIG. 14 (C) in accordance with the scanning clock from the clock generator 57, gives these synchro signals to the line image sensor 50. Also, effective area signals (taking a high level in the effective area), as shown in FIG. 14 (F), which defines the effective area of the video signals corresponding to one line are produced by the line scanning synchro signals and the scanning clock.

Figure 15B:
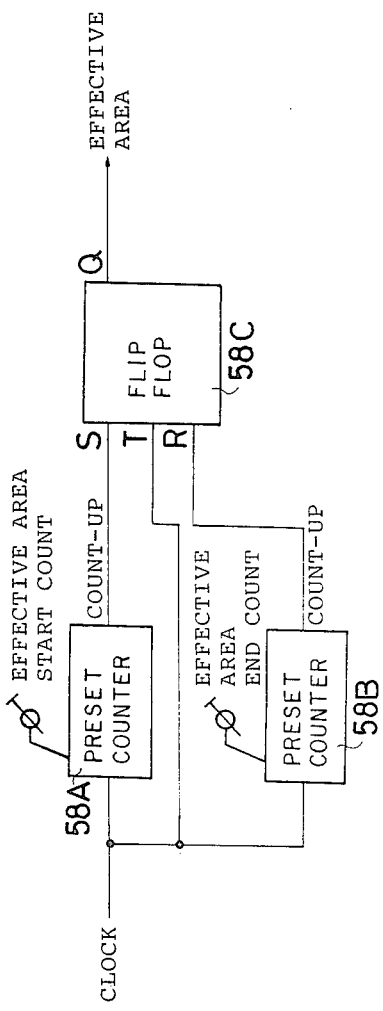
FIG. 15B is a block diagram showing a generating circuit of effective area signals.

The effective area signals are obtained as the output of the flip-flop 58C in the timing control circuit 58, wherein, as shown in FIG. 15B, the flip-flop 58C is set when the clock counted by the preset counter 58A reaches a predetermined value (effective area start count), and reset again when the clock counter by preset counter 58B reaches another predetermined value (effective area end count).

Furthermore, the timing control circuit 58 produces line scanning end signals as shown in FIG. 14 (E) according to the line scanning synchro signals and the scanning clock. For instance, the line scanning end signals (see FIG. 14 (E)) are generated when the total count number of the scanning clock counted from the position of the line scanning signal reaches N, where N is the bit number of the line image sensor 50.

The address counter 71 produces an address showing the position in the scanning direction of the image per line, counting the scanning clock of the clock oscillator 57 from the position of the line scanning synchro signal.

The amplification circuit 59 amplifies, together with the noise filtration, the video signals output from the line image sensor 50 and transmits its output signals to the binary coding circuit 60, the differentiation circuit 61 and the integration circuit 62.

The binary coding circuit 60 executes the binary coding of output signals from the amplification circuit 59, and the differentiation circuit 61 differentiates output signals of the amplification circuit 59, while the integration circuit 62 integrates only a portion of outputs remaining in the effective area of the amplification circuit 59 according to the effective area signals, the above output signals of the differentiation circuit 61 being processed by the binary coding circuit 63.

When the effective area signals are found at high level, the AND gate 64 is opened to make outputs of the binary coding circuit 60 pass, and another AND gate 65 is opened similarly at high level of the effective area signals to make output of another binary coding circuit 63 pass, while further another AND gate 66 is opened at high level of the AND gate 64 outputs to make the scanning clock pass.

The counter 67 counts outputs of the AND gate 64 in order to detect the number of individual patterns of the article m, which appeared in binary-coded video signals per line, i.e. the change number of the binary-coded video signals.

The counter 68 counts output signals of AND gate 66 and detects the pattern length of the article in binary-coded video signals per line.

The counter 69 counts output of the AND gate 65 and detects the change number of the video signals differentiated and then binary-coded per line, i.e. the differentiation change number.

The memory 70 responds to outputs of the AND gate 65, i.e. to the level change of the video signals in the effective area, so as to store the address from the address counter 71 as the change address.

The A/D converter 72 converts and then output the output of the integration circuit 62. The video characteristics extraction circuit 51 multiplexes through the multiplexer 73 respective data; the change number data, pattern length data of the article m and the change address of the above mentioned counters 67, 68, 69, 70 and the A/D converter 72, and transmits the multiplexed data as the characteristics data, together with the line scanning end signal, to the high speed processor 52.

Figure 16:
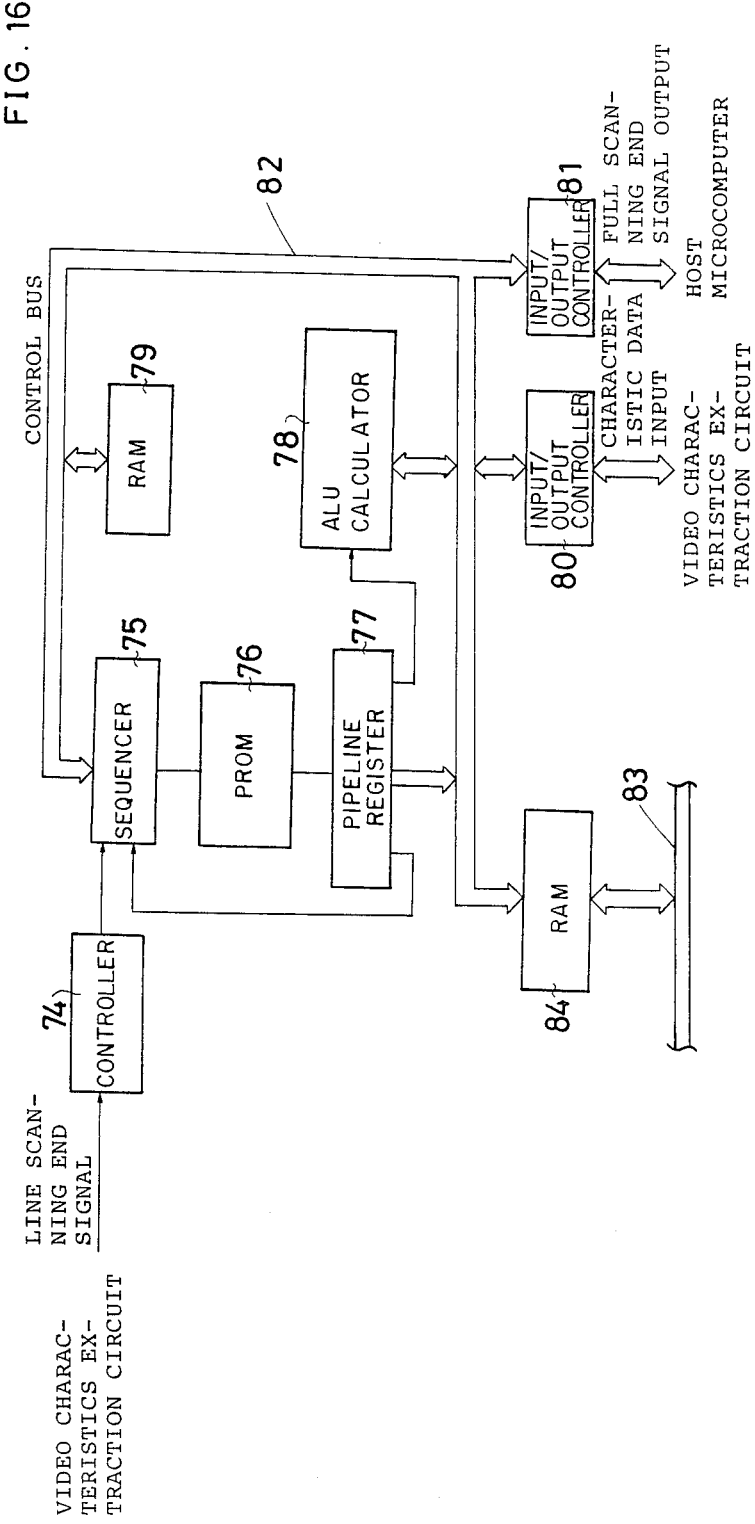
FIG. 16 is a block diagram showing construction of a high speed processor.

FIG. 16 is a block diagram showing the construction of the high-speed processor 52, which comprises the offering controller 74 (AM 2914 manufactured by AMD, U.S.A.) responding to the line scanning end signals, the sequencer 75 (AM2910 manufactured by AMD, U.S.A.), the PROM 76 storing the microcode, the pipeline register 77, the ALU calculator 78 (AM29116; ditto) incorporating, for instance, a 16-bits microprocessor, the RAM 79, the input/output controller 80 (AM2950; ditto) for characteristics input responding to the video characteristics extraction circuit 51, the input/output controller 81 for output of full scanning end signals to the host microcomputer MC, the control bus 83 of the host microcomputer MC and the bidirectional RAM 84 of the host microcomputer MC.

Figure 17:
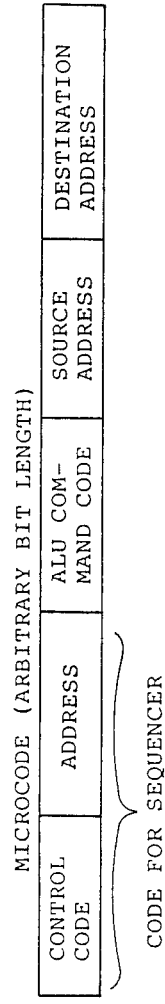
FIG. 17 is an explanatory view showing a microcode construction.

This high-speed processor 52 stores, as shown in FIG. 17, microcode, consisting of code (control code, address), ALU instruction code, source address and destination address, of arbitrary bit length in the PROM 76 and the sequencer 75 instructs the microcode address to be run in next step according to its control input to the sequencer 75 per fundamental command circle. As a result, the microcode at the instructed address is read out of the PROM 76 and the ALU command is output from the pipeline register 77. The ALU arithmetic unit 78 decodes, calculates and transfer this ALU instruction code and sets the microcode address to be run in next step to the sequencer 75.

When line scanning end signals enter the offering controller 74, the offering controller 74 presets the leading microcode address for input (to store in the RAM 79) processing of the video characteristics extraction circuit 51 and gives it to the sequencer 75. Thus, the high-speed processor 52 is started.

Meanwhile, characteristics data from the video characteristics extraction circuit 51 being input through the input/output controller 80, shape characteristics data such is acceptance judge data covering all lines of the articles m transported, area value, etc. are stored temporarily after full scanning of the article m transported in the bidirectional RAM 84 and then outputs the full scanning end signal showing the article m has been fully scanned, while the host microcomputer MC reads out the acceptance judge data covering total lines and the shape characteristics data of the article m transported.

Figure 18A:
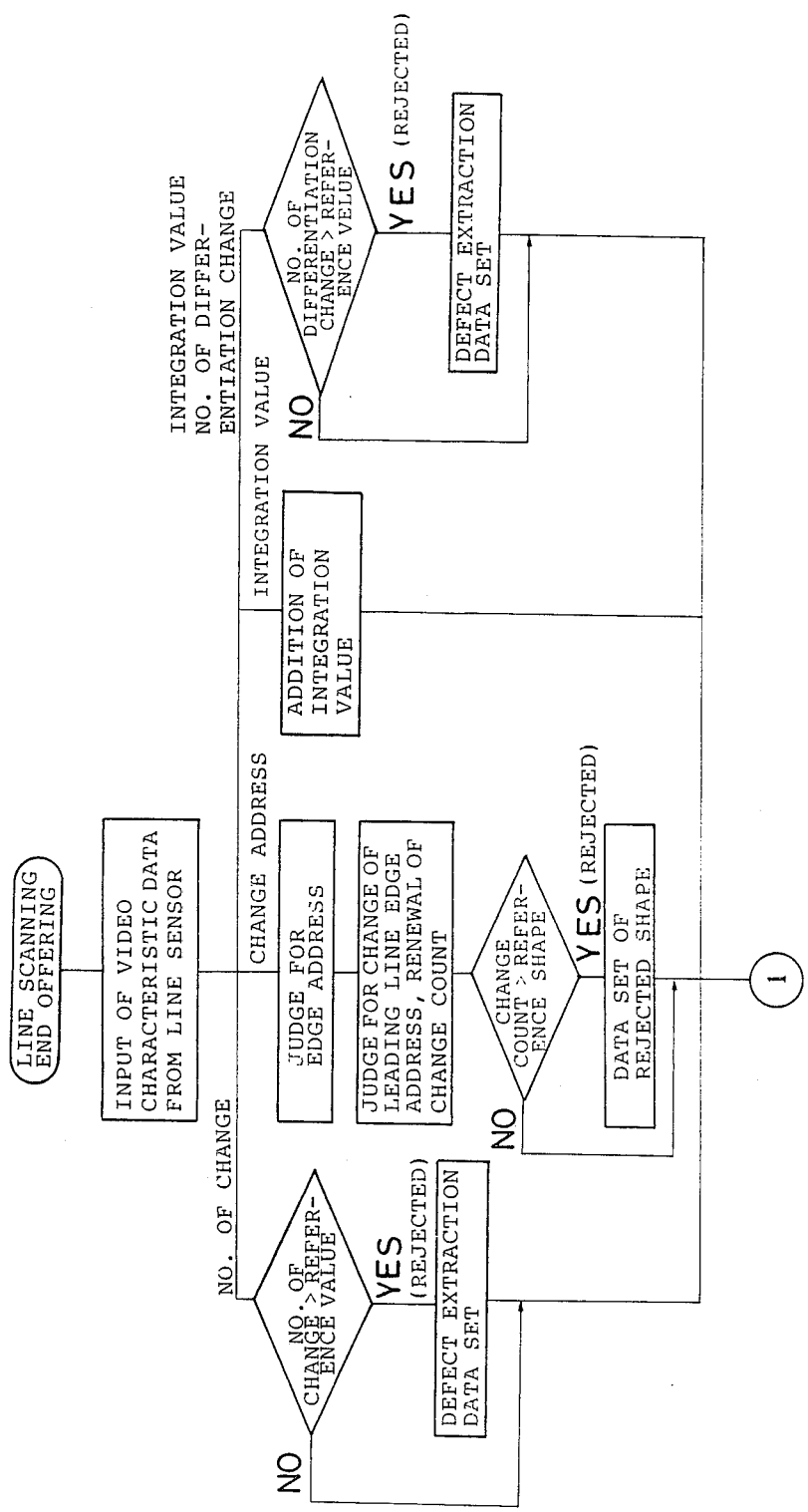
Figure 18B:
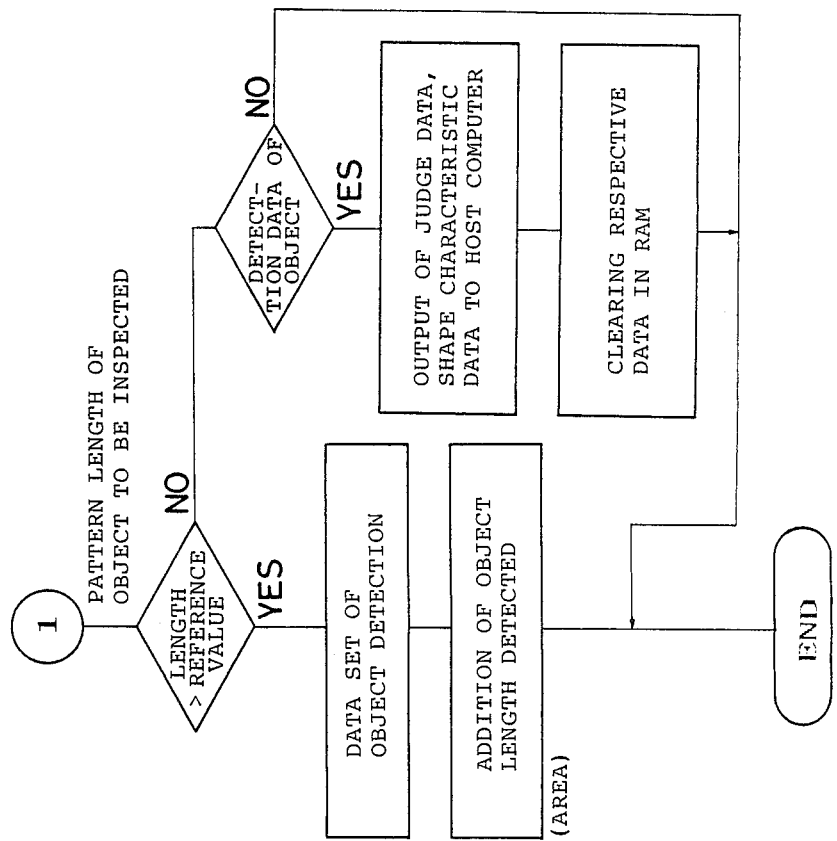

Now various processings by the high-speed processor 52 will be described, referring to FIGS. 18A and 18B. Figs. 18A and 18B show together a single flow chart when jointed through numeral ①. When line scanning end signals are offered, characteristics output (change number data, change address data, integration data, differentiation change number and pattern length data of the article) from the video characteristics extraction circuit 51 is given as the input.

If the change number data are greater than the reference value, comparing the former with the latter, the defect extraction data as the rejection judge are set in the location corresponding to that line of the defect extraction data area in the RAM 79, while there is no such setting if not.

Moreover, the change address data are used to judge which edge address corresponds to the edge of the article m and further it is judged whether the judged address is increased or decreased in comparison with the preceding line edge address of the article m (variation judge of edge address). Then, the difference between the current line edge address and the preceding line edge address is stored in a renewed manner in the variation count value area in the RAM 79. If this variation count value is greater than the reference value selected according to the variation, the corresponding shape rejection data is set in a location corresponding to that line of the shape rejection data area in the RAM 79, while there is no such setting if not.

Moreover, the integration data are accumulated in the integration data area.

On the other hand, if the differentiation change number data are greater than the reference value, comparing the former with the latter, the corresponding defect extraction data is set in a location corresponding to that line of the defect extraction data area in the RAM 79, while there is no such setting if not.

Then, the pattern length data of the article m transported are compared with the reference value. If the former is greater than the latter, it is interpreted that the article m entered that line and the detection data of the article are set in the article m data area of the RAM 79, while the pattern length data of the article m are accumulated in the pattern length data area (area data area) of the article m and then the processings are all over.

On the other hand, if the pattern length data of the article m are smaller than the reference value, i.e. the article m transported is found just before its entrance onto the line or it has passed already the line, it is judged whether the detection data of the article m is set or not, and if not (the article m found before its entrance onto the line), the processing is immediately over, while if yes (after its entrance onto the line), the judge data (defect point extraction data, shape rejection data and defect extraction data) are read out of respective data area of the RAM 79 and stored in the bidirectional RAM 79 and the shape characteristics data (integration value, accumulation value, accumulated value of pattern length, i.e. area data of the article m) are stored in the bidirectional RAM 84, with succeeding output of full scanning end signals and data clearing of respective data areas in the RAM 79.

FIG. 19 is a timing chart showing the operation timings of the video characteristics circuit 51 and the high-speed processor 52. FIGS. 19 (A), (B), (C) and (D) are showing the line scanning synchro signals, the video signals output from the line image sensor 3, the line scanning end signals and the full scanning end signals, respectively.

The video signals in each zone ① to ⑤ are processed by the high-speed processor 52 in each zone ①' to ⑤' after the occurrence of line scanning end signals, and are sent to the bidirectional RAM 84 after the full scanning, the full scanning end signals being issued later.

FIG. 20 is a block diagram showing the construction of the host microcomputer MC, which comprises the CPU 85, the offering controller 86, the ROM 87, the RAM 88, the input/output controller 89, the control bus 83 and the bidirectional RAM 84.

The input/output controller 89 generates device control outputs, which control the devices such as the driving part for feeding, conveying, sorting, etc. of the articles m to be transported. The offering controller 86 receives the detection input of the articles m to be transported for sorting control, monitoring inputs for device driving status as the device control input and the full scanning end signals from the high-speed processor 52.

Figure 21:
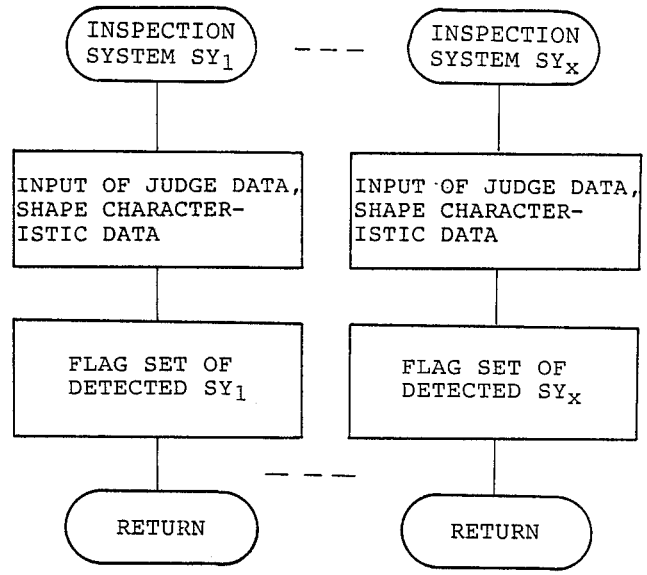
FIGS. 21 and 22 are flow charts showing operations of the host computer respectively.

Then, the processing detail in the host microcomputer MC will be described with the reference to FIG. 21 to FIG. 23. For instance, if an offering by the full scanning end signals takes place from the high speed processor 52 in the inspection system $SY_1$, the judge data and the shape characteristics data are input, as shown in FIG. 21, from the bidirectional RAM 84 corresponding to the high-speed processor 52, so as to set the detection $SY_1$ flag. These offer processing are executed independently in response to the full scanning end signals from the high-speed processor 52 in the inspection systems $SY_1$ to $SYx$, the detection flags being separately set in response to the inspection systems $SY_1$ to $SYx$.

Figure 22:
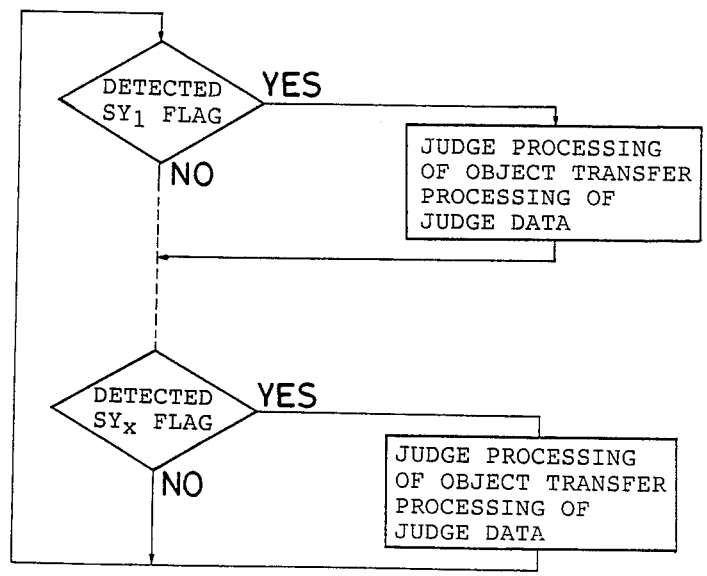
Figure 23B:
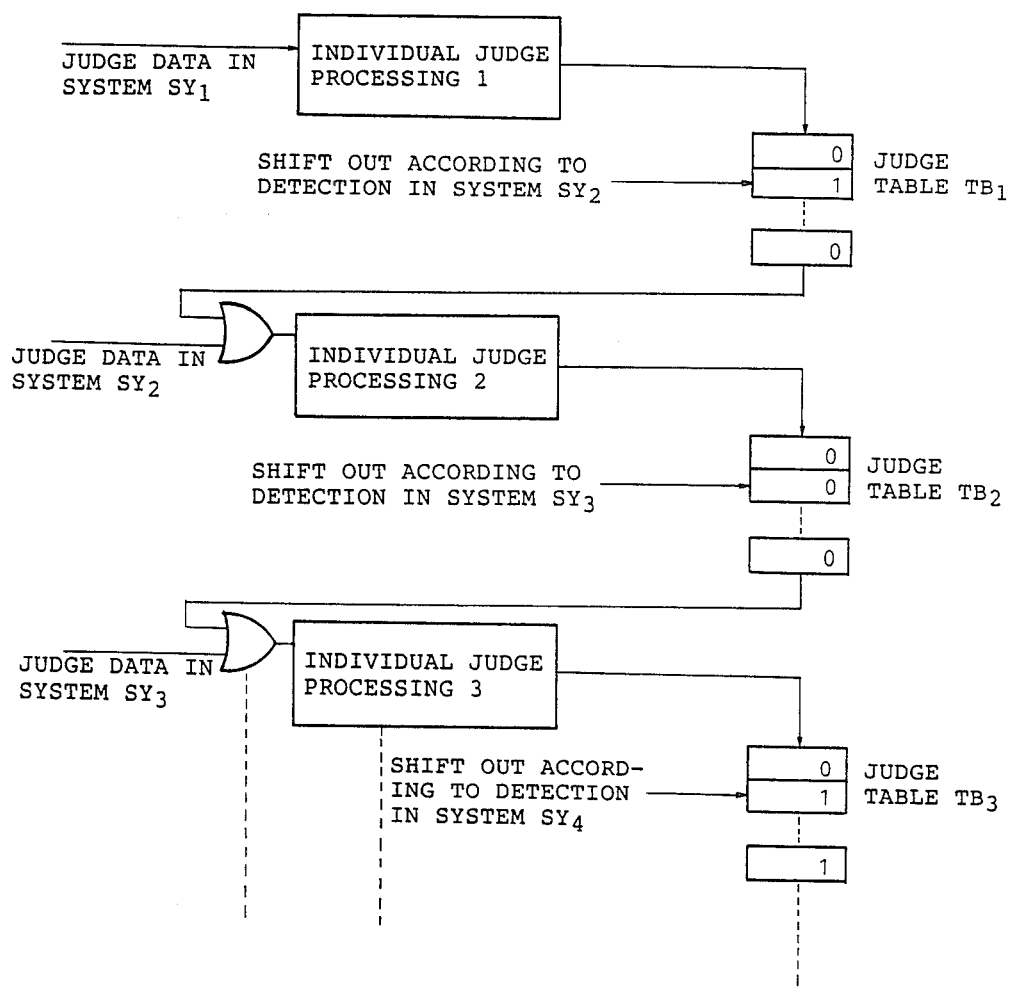
FIGS. 23A and 23B are explanatory views showing operations of the host computer respectively.

As shown in FIG. 22, overall judge processing of the inspection is executed in accordance with the status of the detection flags. If the detection $SY_1$ flag has not been set, for example, the judgement is applied to setting status of the next detection $SY_2$ flag. If the detection $SY_1$ flag has been set already, the judge processing of the article m transported and the transfer processing of the judge data are executed and then followed by the setting judgement for next detection $SY_2$ flag, these processings being repeated successively with respect to detection flags for all inspection systems $SY_1$ to $SY_3$.

Figure 23A:
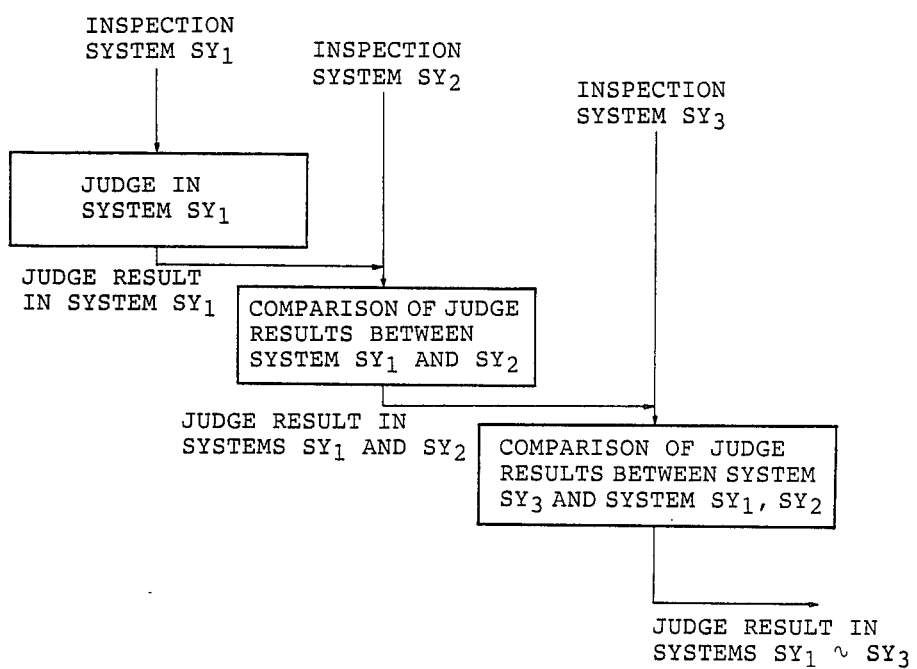

In the judge processings mentioned above of the articles m, the data such as area value, accumulated area value, etc. of the article m is compared with a preset reference value through the self-learning capability (described later) and this judge result and judge data (data of each inspection item) sent from the high-speed processor 52 are used for overall visual judgement of the article m, followed by a processing to decide the sorting of the corresponding article m. Meanwhile, through transfer processing of the judge data to the preceding inspection system, the judge data is also added as the judge data of the current inspection system, while, as shown in FIG. 23A, the current inspection system is compared with the preceding inspection system in judge processing of the current article m, so that the acceptance judgement for a combination of the both inspection systems is executed to decide the sorting. When described more in detail, in the overall judgement for a plurality of the inspection systems of the host microcomputer MC, the host microcomputer MC executes at first a separate judge processing for the judge data of the inspection system $SY_1$ through detection offer signals of the article m transported from each inspection system $SY_1$, $SY_2$ ... $SYx$, stores the acceptance judge result for that system in the judge table $TB_1$, and then read the data out of the judge table $TB_1$ while the logical sum with judge data of the inspection system $SY_2$ is judged separately to store the acceptance judge result in the judge table $TB_2$. The same processings are repeated for respective remaining inspection systems $SY_3$ ..., generating finally the overall acceptance judge output after passing through all of the inspection systems $SY_1$ ... $SYx$.

The self-learning function for acceptance judgement will be described here. In the self-learning, for example, for setting the reference value related with the area value, sample articles are supplied before entering the production inspection such that the area values of each article are input through the host microcomputer MC and summed up by a predetermined member of the samples, while the reference value for optimum comparative judgement of the articles are automatically set according to average value, maximum value, minimum value, and standard deviation obtained. Thus, a statistical control value obtained from the article population selected as the sample is automatically set as the reference value for acceptance judgement.

As described above, the visual inspection mechanism according to this invention can take characteristics data by line by line out of video signals from the line image sensor and processes them line by line through the high-speed processor. Therefore, complicated processings can be handled by the high-speed processor, which program may be altered according to the tasks required. Moreover, high-speed processing of the characteristics data through the high-speed processor realized real time visual inspection, with rather low costs, because a high speed more-than-medium capacity computer or a complicated hardware circuit is not used.

As many apparently widely different embodiments of this invention may be made without departing from the spirit and scope thereof, it is to be understood that the invention is not limited to the specific embodiments thereof except as defined in the appended claims.

What is claimed is:

1. A transporting device for transporting articles, comprising:
   a pair of opposed parallel plates having respective outer edges spaced apart from one another to form an open slit area between said outer edges and an inside area between respective central portions of said opposed plates, both said outer edges being movable and adapted to receive said articles thereon to transport the same, and
   a suction means for sucking air from the outside through said open slit area and into said inside area to hold said articles by suction on said outer edges.

2. The device as in claim 1, wherein said pair of opposed plates comprises a pair of rotary discs concentrically connected with a rotatable cylindrical shaft such that said pair of opposed plates rotate together when said rotatable cylindrical shaft is rotated, said inside area being in communication with an inner space of said rotatable cylindrical shaft and in turn in communication with said suction means.

3. The device as in claim 1, wherein said pair of opposed plates comprises a pair of fixed plates having guide rails adjacent said respective outer edges and said transporting device further comprises respective pairs of running strings guided by said guide rails.

4. The device as in claim 3, wherein said strings are endless.

5. The device as in claim 4, wherein said strings have a return path located in said inside area.

6. The device as in claim 1, wherein said inside area has a dimension between said opposed plates which is greater than a width of said slit area.

7. A transporting device, comprising:
   a first transport means comprising a first pair of opposed parallel plates having respective outer edges spaced apart from one another to form an open slit area between said outer edges and an inside area between respective central portions of said opposed plates, both said outer edges being movable and adapted to receive said articles thereon, and a first suction means for sucking air from the outside through said slit area and into said inside area to hold said articles by suction on said outer edges,
   a second transport means comprising a second pair of opposed parallel plates having respective outer edges spaced apart from one another to form an open slit area between said outer edges and an inside area between respective central portions of said opposed plates, both said outer edges being movable and adapted to receive said articles thereon, and a suction means for sucking air from the outside through said slit area and into said inside area to hold said articles by suction on said outer edges,
   said first pair and said second pair of opposed parallel plates being positioned in substantially planar end-to-end relationship with each other spaced at a predetermined distance from each other, said predetermined distance being adapted (i) to be greater than or equal to the standing height dimension of articles supported on said first transporting device and said second transporting device and (ii) to enable articles to be delivered from said first transporting means to said second transporting means.
   a first visual profile inspection means located adjacent said slit of said first transport means, and
   a second visual profile inspection means located adjacent said slit of said second transport means.

8. The device as in claim 7, wherein said first visual inspection means comprises means for inspecting a visual appearance of said articles in a given direction, and said second visual inspection means comprises means for inspecting a visual appearance of said articles in another direction opposite to said given direction.

9. The device as in claim 7, wherein said first visual inspection means comprises a first line image sensor and said second visual inspection means comprises a second line image sensor, both said first line image sensor and said second line image sensor being located adjacent the slit of the corresponding first transport means and second transport means, so that said articles cross respective scanning line directions of said first line image sensor and said second line image sensor while being transported on said first transport and said second transport means, said transporting device further comprising a video extraction circuit, responsive to outputs from said first line image sensor and said second line image sensor, for analog/digital processing of said outputs from said first line image sensor and said second line image sensor and for outputting video characteristics data, and a high speed processor, responsive to said video characteristics data from said video extraction circuit, for inspecting and judging said video characteristics data through a pipeline control system.

* * * * *